June 26, 1923.
C. F. HOOVER ET AL
1,459,891
DIRIGIBLE HEADLIGHT FOR VEHICLES
Filed Aug. 30, 1922
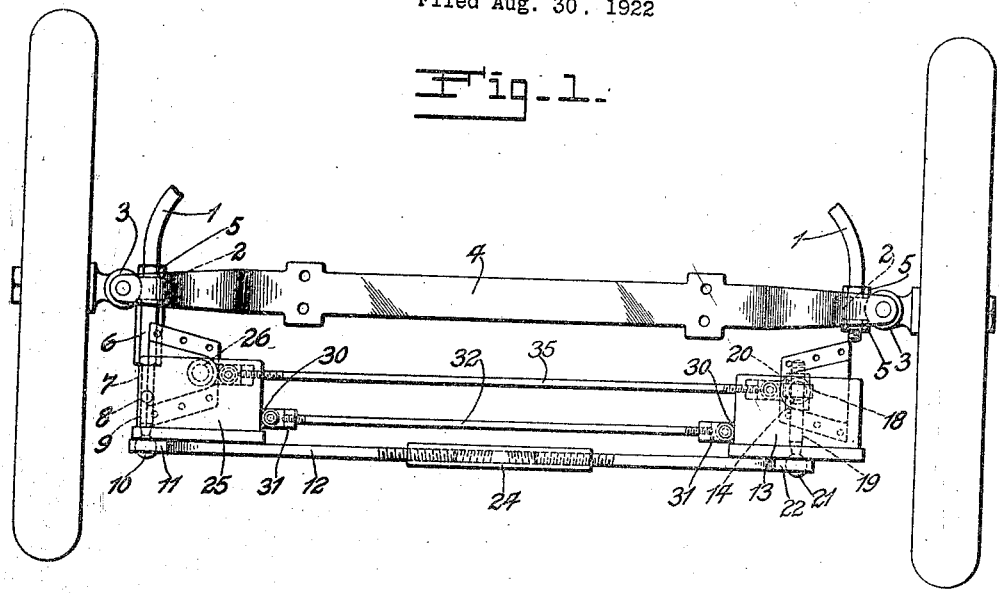
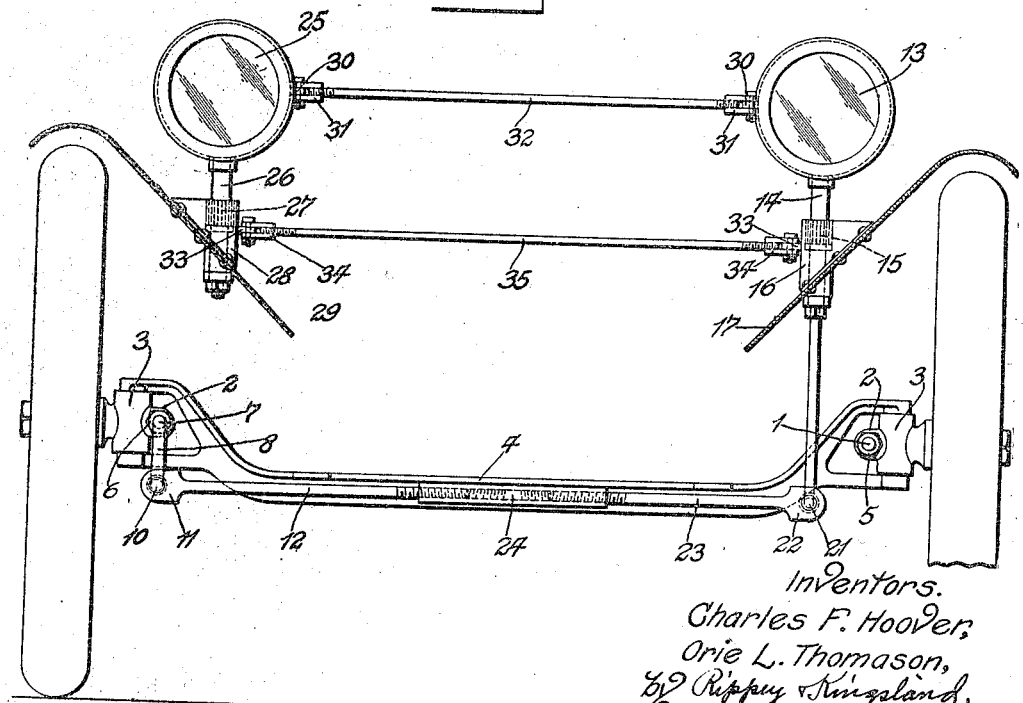
Inventors.
Charles F. Hoover,
Orie L. Thomason,
by Rippey Kingsland,
Their Attorneys.

Patented June 26, 1923.

1,459,891

UNITED STATES PATENT OFFICE.

CHARLES F. HOOVER, OF VENICE, ILLINOIS, AND ORIE L. THOMASON, OF ST. LOUIS, MISSOURI, ASSIGNORS TO SAID HOOVER.

DIRIGIBLE HEADLIGHT FOR VEHICLES.

Application filed August 30, 1922. Serial No. 585,193.

*To all whom it may concern:*

Be it known that we, CHARLES F. HOOVER, residing at Venice, Illinois, and ORIE L. THOMASON, residing at St. Louis, Missouri, both citizens of the United States, have invented new and useful Improvements in Dirigible Headlights for Vehicles, of which the following is a specification.

This invention relates to dirigible headlights for vehicles.

An object of the invention is to provide improved means for turning the lamps of a vehicle so as to direct the light to follow the course of the vehicle as it turns, in combination with means of novel and improved form for operating the lamps.

Other objects will appear from the following description, reference being made to the drawing in which—

Fig. 1 is a plan view of our invention.

Fig. 2 is a front elevation.

Our invention as shown is in connection with a well known steering mechanism in which the steering arms 1 have their forward ends extending through eyes or sockets 2 in connection with the inner sides of the steering knuckles 3 pivotally supported between the bifurcated ends of the front axle 4. In the usual construction shown at the right of Fig. 1 nuts 5 on the steering arms 1 clamp against the front and rear sides of the eyes or sockets 2 and thereby secure the steering arms in position.

Our invention displaces the nut 5 on the front end of one of the steering arms 1 and in place of such displaced nut we substitute a special long nut 6 which serves two functions. One of the two functions served by the special long nut 6 is to perform the duty of the displaced nut 5 with respect to the steering arm 1, and the other function of said special nut 6 is to support a part of our present invention and to operate and control our entire invention. A rod 7 is supported for rocking movements in the forward end of the nut 6. The rod 7 is of angular formation, being provided with a downwardly extending part 8, and a forwardly extending part 9 which is in front of the axle 4. The front end of the lower portion 9 of said rod has a ball 10 thereon engaged within a socket 11 on a rod 12 and forming a pivotal connection permitting the rod 12 to swing vertically and to oscillate the rod 7—8—9 sufficiently to prevent straining of the parts due to the vibration of the chassis of the vehicle, or to the rise and descent of the chassis of the vehicle upon the springs.

The lamp 13 at the opposite side of the vehicle is supported on a spindle 14 in an anti-friction bearing 15. The anti-friction bearing 15 is within a support 16 on the guard 17. The spindle 14 extends downwardly and terminates in approximately the same horizontal plane as the lower portion 9 of the rod 7. The lower end of the spindle 14 is provided with an eye 18 in which a horizontal forwardly extended rod 19 is secured by clamp nut 20. The rod 19 is in the same horizontal plane as the lower portion 9 of the cooperating rod and has a ball 21 on its forward end pivotally engaged within a socket 22 on a rod 23 in axial alinement with the rod 12. The inner ends of the rods 12 and 23 are spaced apart and are provided with right and left hand screw threads respectively. A sleeve 24 has right and left hand threads within its respective ends and is screwed onto the ends of the rods 12 and 23, the same constituting means for connecting and accurately adjusting and varying the combined length of the connection thus formed.

From this it is obvious that when the direction of travel of the vehicle is changed the lamp 13 is turned accordingly. Further, the parts are not strained by the vibration or by the rise and descent of the vehicle body and chassis, because there are no rigid connections.

The lamp 25 at the opposite side of the vehicle from the lamp 13 is supported on a spindle 26 mounted in an anti-friction bearing 27. The bearing 27 is in a support 28 on the guard 29. Projections 30 on the lamp cases have clevises 31 pivoted thereto. The clevises 31 have threaded holes in them receiving the threaded ends of a connecting rod 32, the threads being positively formed so that the connections may be accurately adjusted. As this connection is in front of the lamp spindles 14 and 26 it is obvious that the lamps will be turned in unison.

The supports 16 and 28 have inward projections 33 to which clevises 34 are pivoted and which receive the oppositely threaded ends of a rod 35 forming a proper connection between the supports for the lamp spindles to prevent strain upon the operating parts.

From the foregoing it will be seen that our invention serves and accomplishes all of its intended objects. The lamps are positively and accurately operated by the steering mechanism of the vehicle and the construction and relationship of the parts are such that they are not subjected to strains when the vehicle is in use or at other times. The parts are so connected that they may be easily detached and accurately adjusted. The invention is relatively inexpensive and may be installed without great trouble. The operation is easy.

We do not restrict ourselves unessentially but what we claim and desire to secure by Letters Patent is:—

1. In a vehicle having a front axle, a steering knuckle arranged to turn on a vertical axis at one end of the axle, and a socket on the inner side of the steering knuckle, the combination of a steering arm extending forwardly through said socket and beyond the front side thereof for turning the steering knuckle, clamping nuts at the front and rear sides of said socket securing said arm in rigid position, a rod separate from said steering arm secured in the nut at the front side of said socket and extending downwardly and forwardly to the plane of the axle, a transverse rod in the plane of the front axle having swivel connection with said first-named rod, a vertical lamp spindle mounted for turning movements, a forwardly extended rod in connection with the lower end of said spindle in the same horizontal plane with the forward end of said first-named rod and having swivel connection with said second rod, a lamp on the upper end of said spindle, a second lamp spindle, a lamp mounted on the second spindle, and a connection for turning the second lamp from the first one.

2. In a vehicle having a front axle and a steering knuckle arranged to turn on a vertical axis at one end of the axle; the combination of a detachable steering arm extending rearwardly from the steering knuckle, a separate rod extending downwardly and forwardly from the steering knuckle to the plane of the axle, a releasable member rigidly uniting said arm and said rod and holding them in rigid connection with the steering knuckle, a transverse rod in the plane of the front axle having swivel connection with the front end of said first-named rod, a vertical rotary lamp spindle, a forwardly extended rod in connection with the lower end of said spindle in the same plane with the forward end of said first-named rod and having swivel connection with said second rod, a lamp on the upper end of said spindle, a second lamp spaced from said first-named lamp, and an adjustable connection for turning the second lamp from the first one.

CHARLES F. HOOVER.
ORIE L. THOMASON.